UNITED STATES PATENT OFFICE 2,043,232

PROCESS OF CONDUCTING ALKALI FUSIONS

Samuel G. Burroughs, Pittsburgh, Pa., assignor to Pennsylvania Coal Products Company, a corporation of Pennsylvania No Drawing. Application October 11, 1934, Serial No. 747,927

5 Claims. (Cl. 260—154)

This invention is concerned with the fusion of salts of aromatic sulphuric acids with molten alkali metal hydroxides to form phenols, and especially with the fusion of the salts of benzene disulphonic acid with caustic alkalis to form resorcin.

It has long been a well known fact to those skilled in the art that the fusion or melting of the salts of aromatic sulphonic acids, especially the sodium salt, with molten caustic alkalis, as sodium hydroxide, produced the corresponding salt of the phenol. The process is a costly one, according to present standards, because a large excess of the caustic alkali is necessary to keep the fusion mass in a molten condition. Whenever the fusion solidifies, there is rapid decomposition because of local superheating. In carrying out an alkali fusion by the known method, the sulphonic acid salt is added to 2 or 3 parts of molten caustic alkali, or concentrated water solutions of the same, if lower temperatures are desired either in the form of a dry powder or as a concentrated water solution, and the mixture is stirred in a molten condition until the reaction is complete. The reason for the necessity of employing large excesses of caustic alkalis by such methods lies in the fact that unless this excess of molten alkali is present as a fluxing agent, the mass will become solid or semi-solid because of unreacted sulphonic acid salt which has not been properly mixed with the alkali, and also in the fact that during the fusion reaction, sodium sulphite is formed and liberated according to the following equation, in which R is the aryl radical:

$$RSO_3Na + 2NaOH \rightarrow RONa + Na_2SO_3 + H_2O$$

These difficulties may be overcome in some cases by conducting the alkali fusions in a closed vessel, whereby sufficient water is retained to keep the mass molten. However, it is impractical to fuse some sulphonates in this way.

I have now discovered that in all cases where the sulphonic acid salt is soluble in hot water, the amount of caustic alkali necessary to keep the fusion masses in a molten condition, may be greatly reduced by the simple method of adding and dissolving a portion of the caustic alkali to the concentrated solution of the sulphonic acid salt before adding the same to the molten caustic alkali. The amount of caustic alkali which may be added to the solution of the sulphonic acid salt is variable and depends on the degree of solubility of the sulphonic acid salt employed. Usually the caustic alkali is added until the sulphonic acid salt begins to crystallize from the hot solution. By such means the amount of excess caustic alkali necessary has been reduced by approximately 50 per cent.

I have also discovered that, in the case of benzene sodium disulphonate, in addition to the saving of caustic alkali obtained by the above procedure, an additional saving may be brought about by conducting the alkali fusion process in stages. This is possible because at temperatures of between 200 degrees C. and 260 degrees C. sodium benzene disulphonate is converted into the disodium salt of meta phenol sulphonic acid according to the equation—

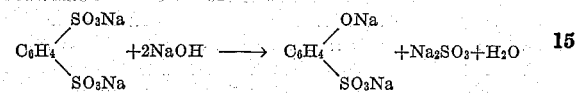

Since the disodium salt of meta phenol sulphonic acid is an extremely soluble compound and does not solidify under the conditions of the caustic alkali fusion process, it is evident that the separation of the less soluble and troublesome sodium sulphite would be a great aid. Accordingly when the fusion reaction has reached a stage where the sulphite content shows a conversion of from 50 to 60 per cent, the mass is drowned in an amount of water such that when cooled, the greater part of sodium sulphite will separate. The liquid from which the sulphite has been separated now contains mainly disodium salt of meta phenol sulphonic acid and free caustic alkali. This solution is now evaporated in the fusion pot and heated further to melt it with the free caustic alkali which it contains and finally heated to a temperature between 300 degrees and 340 degrees C. which is necessary in order to convert the disodium salt of meta phenol sulphonic acid to sodium resorcinate.

The following example may further illustrate my invention:

To 1700 grams of meta benzene disodium sulphonate in the form of a water solution of approximately 50 per cent concentration is added 400 grams of flaked caustic soda with agitation until the caustic alkali has dissolved. In a cast iron pot is added 700 grams of fused caustic soda and 75 grams of water. The pot is then heated until the caustic soda has melted and has reached a temperature between 200 degrees C. and 260 degrees C. The disodium sulphonate-caustic soda solution as prepared above is then added gradually at such a rate that the temperature of the mixture remained between 200 degrees C. and 260 C. When the sulphonate has all been added, the mixture is heated for a short time, say thirty minutes, at this same temperature and is drowned in water and cooled to separate sodium sulphite. The liquor from this separation is now returned to the pot and evaporated and heated to a temperature between 300 degrees and 340 degrees C. The contents of the pot are now drowned in water and acidified with sulphuric acid or other acidic substances, extracted with ether or other suitable solvent, and the ether extract is distilled in vacuo to produce resorcin. A yield of 85 per cent of the theory is obtainable. It is also to be noted that the total amount of caustic alkali employed was 1100 grams, which amount is but 13 per cent in excess of the theoretical amount.

Although it is possible to proceed as set forth in the above example, it is not necessary to do so in order to carry out my method in a practical manner. It is possible to make many changes in the procedure without departing from the scope and spirit of my invention. For instance, the amounts of caustic alkali used in the first step of the fusion or the amount added to the disodium sulphonate solution prior to fusion may be reduced, and the caustic alkali thus saved may be added in the second step of the fusion process. Caustic potash may be used instead of the caustic soda or a mixture of caustic soda and caustic potash. Potassium hydroxide may also be used either alone or in conjunction with sodium hydroxide in any of the steps of the process. Where potassium hydroxide is used, the temperatures at which it is necessary to conduct the fusion process in each step would have to be reduced on account of the increased reactivity of potassium hydroxide in the fusion process. Likewise it is possible to reduce the fusion temperatures in either step and then allow the fusions to proceed for a longer time. Also since the liquid containing the disodium salt of meta phenol sulphonic acid, caustic alkali, and water, which is produced in the first step of the fusion process, is difficult to evaporate because of foaming, I have found it advisable to carry out the second step of the fusion process in a different and specially built apparatus in a continuous manner.

The apparatus which I used in conducting the second stage of the fusion process may be described as follows: A steel plate about forty feet long, twenty inches wide, and one-half inch thick, inclined at an angle of about five degrees from the horizontal is set over a buck furnace which may be heated with gas. A series of iron scrapers fastened to an endless sprocket chain are so arranged as to traverse the plate over most of its length, and to drag the material to the lower end, where the fused material may be dumped into a suitable vessel containing water. The temperature of the plate may be observed by placing pyrometer wires in holes drilled in the side of the plate at various intervals along its length.

In carrying out the second stage of the fusion process in the apparatus described above, it was found advisable to proceed as follows: The plate was heated to a temperature between 300 degrees C. and 400 degrees C. as evenly as possible over its whole length. The liquid obtained in the first step of the fusion process was then added to the higher end of the plate in a slow stream through a perforated trough which acted as a distributor, and was allowed to flow over the hot plate where the slow moving scrapers gradually moved the material toward the lower end. The rate of movement of the scrapers was such that any part of the material remained on the plate but four minutes, during which time it traversed the length of the plate. The time may vary from 2 to 10 minutes, depending on the temperature of the plate and thickness of the film.

In the above process, I have merely described the optimum conditions which are advisable to be employed in carrying out the method of my process in a practical manner. All the conditions may be changed over a wide range without departing from the spirit of my invention, the basic ideas being, first, the dissolving of a portion of the caustic alkali in the aqueous solution of the sulphonic acid salt before adding the same to the remaining portion of the molten caustic alkali; second, the carrying out of the fusion of the sodium disulphonic acid salts in stages, and the separation of the sodium sulphite formed in the first stage before proceeding with the second stage, and thirdly, the conduction of the fusion by passing the solution containing the disodium salt of meta phenol sulphonic acid and caustic alkali in a thin film or layer over a heated metal surface.

What I claim is:

1. The process of fusing aromatic sulphonic acid salts which are soluble in hot water with caustic alkali, which consists in melting a part of the caustic alkali, dissolving the remainder of the caustic alkali in a water solution of the aromatic sulphonic acid salt and then adding the solution to the molten caustic alkali.

2. The process of fusing disodium salt of benzene disulphonic acid with caustic alkali, which consists in melting a part of the caustic alkali, dissolving the remainder of the caustic alkali in a water solution of said disodium salt and then adding the solution to the molten caustic alkali.

3. The process of conducting the fusion of the disodium salt of benzene meta disulphonic acid with molten caustic alkali wherein the amount of caustic alkali is kept below the limit of about 15 per cent excess of the theory, by proceeding with the reaction in the three stages as follows: first dissolving the disulphonic acid in hot water and adding thereto divided caustic alkali until the salt starts to crystallize, second, adding the solution of benzene disodium disulphonate as thus provided to molten caustic alkali at a temperature between 200 and 260 degrees C. whereby the disodium salt of benzene disulphonic acid is converted into the disodium salt of meta phenol sulphonic acid, drowning the reaction mixture and cooling to eliminate the sodium sulphate formed and to form a water solution of the disodium salt of meta phenol sulphonic acid containing free caustic alkali in excess, and third, evaporating the solution obtained in the second stage at a temperature between 300 and 360 degrees C. to convert the disodium salt of meta phenol sulphonic acid into sodium resorcinate.

4. The process of conducting the fusion of the disodium salt of benzene meta disulphonic acid with molten caustic alkali wherein the amount of caustic alkali employed is kept below 15 per cent excess of the theory, the steps of which consist of dissolving 1700 parts of the disodium salt of meta benzene disulphonic acid in hot water, adding 400 parts of caustic soda to the same, stirring until the caustic soda has dissolved, adding at a temperature between 200 degrees C. and 260 degrees C. the solution thus formed to 700 parts of caustic soda, to which 75 parts of water have been added, stirring until the disodium salt of meta benzene disulphonic acid has been converted into the disodium salt of meta phenol sulphonic acid, drowning the reaction mixture in water sufficient to dissolve the disodium meta phenol sulphonic acid and free caustic soda present, cooling the solution, separating the sodium sulphite, evaporating the solution of disodium meta phenol sulphonic acid containing free caustic soda, heating in a pot with agitation to a temperature between 300 degrees and 360 degrees C. to convert the disodium salt of meta phenol sulphonic acid to sodium resorcinate, and finally drowning in water.

5. The process of producing resorcin which comprises treating 1700 parts of meta benzene disodium disulphonate in the form of a 40 to 60 per cent solution with 400 parts of caustic soda, adding the solution to 700 parts of caustic soda to which 75 parts of water have been added and which has been melted, maintaining the mixture at a temperature between 200 and 260 degrees C. until a free sulphite determination in a sample indicates a conversion between 50 and 60 per cent, by which means the meta benzene disodium disulphonate is completely converted into the disodium salt of meta phenol sulphonic acid, drowning the reaction mixture in sufficient water to dissolve the disodium meta phenol sulphonic acid and the free caustic soda present and cooling it to separate the sodium sulphite formed in the reaction, evaporating the solution thus obtained at a temperature between 300 and 360 degrees C. to convert the disodium salt of meta phenol sulphonic acid into sodium resorcinate.

SAMUEL G. BURROUGHS.